Mar. 27, 1923.

S. H. PAGE ET AL.
CARBURETOR.
FILED MAY 4, 1921.

1,449,621.

Inventors
S. H. Page
J. B. Struble
By Ackerson & Totten
Attorneys.

Patented Mar. 27, 1923.

1,449,621

UNITED STATES PATENT OFFICE.

STANLEY H. PAGE, OF SAN FRANCISCO, AND JACOB B. STRUBLE, OF OAKLAND, CALIFORNIA.

CARBURETOR.

Application filed May 4, 1921. Serial No. 466,785.

*To all whom it may concern:*

Be it known that we, STANLEY H. PAGE and JACOB B. STRUBLE, citizens of the United States, residing, the said STANLEY H. PAGE in the city and county of San Francisco and State of California, and the said JACOB B. STRUBLE in Oakland, county of Alameda, State of California, have invented certain new and useful Improvements in Carburetors, of which the following is a specification.

It has been found necessary in order to successfully use fuels having a high range of boiling points in an engine of the carbureting type, to supply heat to part or all of the ingoing charge of fuel and air. That all portions of this charge may reach each combustion chamber with the same fuel and air ratio, it is necessary that it be made into a homogeneous mixture of air and vaporized or atomized fuel before or as soon after leaving the carbureting device as possible.

As the volumetric efficiency and consequently the power output of an engine of the carbureting type decreases as the temperature of the ingoing charge increases, it has been found desirable to apply only enough heat to the ingoing charge to effect the delivery to each cylinder of a homogeneous and similarly proportioned mixture of air and vaporized or atomized fuel. Such a mixture may be obtained by heating the fuel with a small proportion of air or with the entire air content of the charge. In the present invention the former method is adopted as it results in the absorption of less heat by the charge and consequently but a small loss of volumetric efficiency.

The present invention relates more particularly to that type of carburetor wherein the fuel and air flow are controlled directly by the engine suction without the use of valves and wherein the fuel is supplied through a restricted primary air inlet into a mixture heating tube and discharges from said tube through a constricted channel in a secondary mixing tube, into which air is drawn at a point below the discharge end of the primary heating tube.

With the above mentioned and other objects in view, the invention consists in the novel construction and combination of parts hereinafter described, illustrated in the accompanying drawings and pointed out in the claims hereto appended; it being understood that various changes in the form, proportion, size and minor details of construction within the scope of the claims may be resorted to without departing from the spirit or sacrificing any of the advantages of the invention.

To more fully comprehend the invention, reference is directed to the accompanying drawings, wherein—

Figure 1:
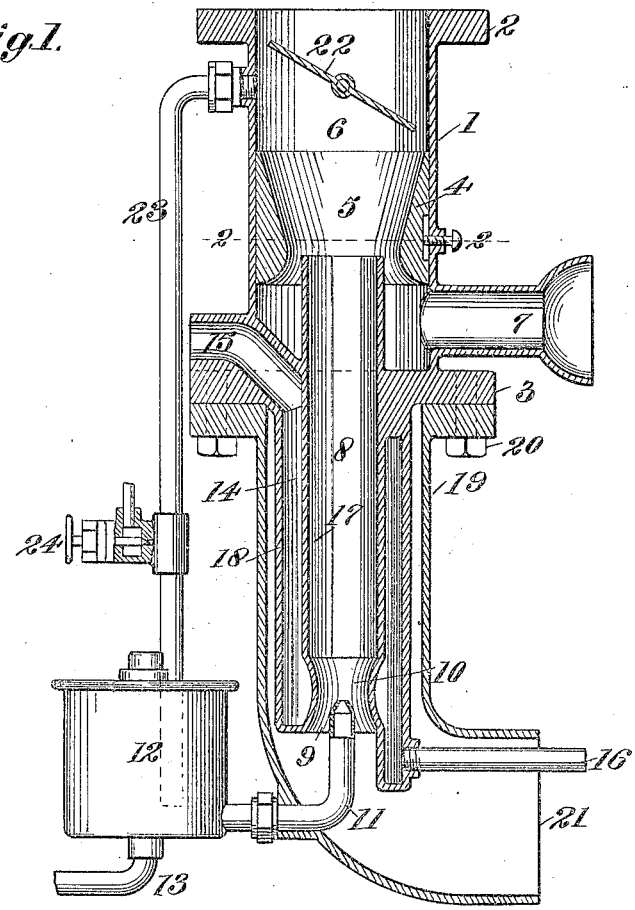
Fig. 1 is a vertical sectional view of the preferred embodiment of our invention.
Figure 2:
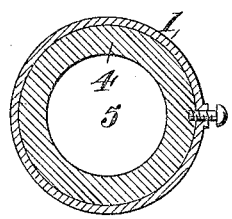
Fig. 2 is a transverse sectional view taken on line 2—2 of Fig. 1.

Referring more particularly to the drawings, wherein like characters of reference designate corresponding parts—1 indicates a tubular main body having an attaching flange 2 at its upper end and formed with a similar flange 3 approximately midway of its length. The main body 1 is illustrated in the form of a casting and carries, adjacent its upper end, a vertically adjustable Venturi tube 4, affording a restricted air passage 5.

The body is provided at the base of the secondary mixing tube 6, within which the member 4 is positioned, with a normally open unobstructed secondary air inlet 7 opening into said tube 6 adjacent its bottom and at a point below the restricted air passage 5.

Disposed with its upper discharge and extending into the tube 6 to a point above the secondary air inlet 7 is a primary mixture heating tube 8 of a diameter less than that of the tube 6, with said upper end disposed concentrically within said tube 6. Said tube 8 is open at its lower end as at 9, affording a primary air inlet, and said lower end 9 is constricted as at 10, and into said constricted portion discharges a suction controlled fuel feed jet 11. Fuel is supplied to the jet 11 preferably from a float controlled chamber 12, which, in turn, receives its supply from a pipe 13 leading from any suitable source.

The tube 8 is surrounded by a jacket 14 having a heat inlet opening 15 preferably at its upper end and a heat outlet 16 preferably at its lower end, the heat supplied thereto being preferably admitted from the engine exhaust, which is a well known practice.

The wall 17 of the tube 8 forms one wall of the chamber 14 and with the outer wall 18 of said chamber are integral structures with the main body 1, said walls being preferably cast at the time of casting of said body.

A tubular secondary body 19 is positioned over the chamber 14 and is secured preferably by bolts 20 to the underside of the flange 3, said secondary body being provided with an air inlet 21 of an area considerably greater than that of the inlet 9.

The usual butterfly valve 22 is illustrated as mounted in the upper end of the tube 6, and for idling purposes fuel is supplied from the chamber 12 through an air bled pipe 23 connecting with the upper end of the tube 6 and into which an air supply is admitted by the controlling valve 24.

In operation the low pressure in tube 6 induced by the engine suction causes air to flow through the restricted passage 5 and the inlet 7, the tube 8 and the restricted passage 10. The air flow thus induced in passage 7 reaches a relatively high velocity when passing the discharge end of tube 8 which is located at the point of smallest diameter of restricted passage 5. The air velocity existing at this point increases the suction induced flow of air in tube 8, causing fuel to be drawn from jet 11 which has its discharge end located at the point of highest velocity in restricted passage 10. This fuel passing with air through heating tube 8 becomes highly heated and upon reaching the cooler air in passage 5 mixes therewith and passes on to the combustion chambers in the form of a relatively cool stable mixture of fuel and air.

We claim:—

1. A carburetor comprising a body portion having a depending mixing tube open at each end, a second body portion surrounding the depending tube of the first body portion and having an air inlet, a fuel supply leading into the lower end of the depending tube, a second mixing tube supported in the first mentioned body portion, above the upper end of the depending mixing tube, and means for supplying air to the first body portion beneath the mixing tube supported therein.

2. A carburetor comprising a body portion having a depending member forming a mixing tube and a jacket therearound for receiving a heating medium, a second body portion surrounding the depending member, in spaced relation thereto and having an air inlet, a fuel supply leading into the lower end of the tube formed by the depending member, a fuel mixing tube supported in the first mentioned body portion above the upper end of the depending tube, and means for supplying air into the first body portion beneath the mixing tube supported therein.

3. A valveless plain tube carburetor comprising a tubular casing open at its lower end to form a primary air inlet, a mixing tube extending into the casing and having its lower end restricted, and a jacket therearound for receiving a heating medium, a fuel supply entering the restricted end of the tube, a second mixing tube supported above the first mentioned tube and having its lower end restricted, the upper end of the first mentioned tube being received in the restricted portion of the second mentioned tube but spaced therefrom, said tubular casing being formed with a valveless port of fixed area through which air is adapted to be supplied between said first and second mentioned tubes at a point below the second mentioned tube and at the upper end of the first mentioned tube.

In testimony whereof we have signed our names to this specification.

STANLEY H. PAGE.
JACOB B. STRUBLE.